UNITED STATES PATENT OFFICE.

MORRIS H. SMITH, OF BROOKLYN, NEW YORK, ASSIGNOR TO GEORGE S. GRAY, OF CINCINNATI, OHIO.

IMPROVEMENT IN METHODS OF CURING PORK.

Specification forming part of Letters Patent No. 57,203, dated August 14, 1866; antedated August 8, 1866; Reissue No. 8,660, dated April 8, 1879; application filed February 8, 1879.

*To all whom it may concern:*

Be it known that I, MORRIS H. SMITH, of Brooklyn, in the county of Kings and State of New York, have invented a new and Improved Process of Curing Meat, as pork, hams, and shoulders, of which the following is a specification.

In the method of curing known as the "dry cure" the fleshy parts of the joints are rubbed with salt and other ingredients, are then placed in a tray or headed up in a tight cask, and are kept covered with the brine resulting from the union of their juices with the said ingredients by basting in the one case, or by frequently rolling the cask in the other, until the meat is cured.

In the process which I have invented the pieces or joints to be cured are suspended in rows, one row above another, to any suitable height, to the ceiling of the room, if desired, in such manner that the brine dripping from one piece or row will fall upon that beneath, and so on until from the bottom piece or row it falls upon the floor of the room.

My improved process and the mechanism used in carrying it out will be described in connection with the curing of hams and shoulders, the slight changes of detail in the mechanism to suit the exigencies of various cuts being within the scope of ordinary skill, and not affecting the principle of my invention.

The joints or shoulders to be cured are suspended, by means of parallel bars or other means substantially the same, in rows, one row above another, as hereinbefore recited, the bars being placed so near together that the butt or larger end of the ham or shoulder cannot pass between them. The most favorable position for receiving and absorbing the brine is obtained by placing the shank down between the bars, the meat resting upon them, and leaning the skin side of the butt of the first piece against the wall or other support, and then leaning the balance of the meat one piece against the other, with the fleshy side upward. The arrangement described causes the brine to drip from one piece of meat to another until it reaches the floor or receptacle provided for it.

In curing hams and shoulders the tapering shape of the joint concentrates brine at the shank, and causes it to drip well upon the butt of the piece beneath.

The floor should be cemented or otherwise made tight, and so arranged that the brine will be collected as it drips, and conducted into some receptacle, from which it is to be pumped or otherwise conveyed to the uppermost rows of meat, over which it is to be poured or sprinkled, to again drip from row to row, be collected, and returned, the operation being kept up until the meat is cured.

The advantages of my method, contrasted with others, are, that the lowermost pieces of meat will not be prevented by the superincumbent weight of those above from freely receiving and absorbing pickle; that the layers can be carried to any height, and the brine from each pass over all beneath; that the quantity of meat undergoing the curing process is nowise limited by the superficial area which may be devoted to it, but every foot of space in the room or building may be made available, allowing, of course, for access to the meat for handling and removing; that a free circulation is obtained around the meat, each piece being exposed to the air, although arranged in comparatively small space, which, in ice-house curing in summer, is of great importance.

Having thus described my invention, what I claim as new, and desire to secure by Letters Patent, is—

1. The improvement in the art of curing meat, consisting in suspending the pieces in rows, one above another, in such manner that the brine dripping from one piece will fall in succession upon each beneath to the bottom of the series.

2. The improvement in the art of curing meat, consisting in suspending the hams or shoulders with the butt upward and the shank down, in such manner that the brine dripping from one ham will fall on that beneath, as herein described.

3. The improvement in the art of curing meat, consisting in suspending the pieces in rows, one above another, in such manner that the brine dripping from one piece will fall in succession upon each beneath, to the bottom of the series, and, collecting this drip, returning it to and discharging it over the uppermost rows, to again pass over the suspended layers until the meat is cured, substantially as described.

Witnesses: MORRIS H. SMITH.
JOHN G. MELLEN,
ANDREW G. MYERS.